United States Patent [19]

Claassen et al.

[11] Patent Number: 5,118,335
[45] Date of Patent: Jun. 2, 1992

[54] TEMPERING RING DESIGN

[75] Inventors: George R. Claassen, New Kensington; Robert G. Frank, Sarver; Rudolph A. Karlo, Natrona Heights; John J. Ewing, Tarentum, all of Pa.

[73] Assignee: PPG Industries, Inc., Pittsburgh, Pa.

[21] Appl. No.: 590,713

[22] Filed: Oct. 1, 1990

[51] Int. Cl.5 .................... C03B 27/00; C03B 35/14
[52] U.S. Cl. ........................... 65/348; 65/288; 65/349; 65/374.1; 65/374.11
[58] Field of Search ............... 65/287, 288, 348, 349, 65/374.1, 374.11

[56] References Cited

U.S. PATENT DOCUMENTS 4,749,399 6/1988 Yamada et al. .................... 65/348

*Primary Examiner*—Joye L. Woodard
*Attorney, Agent, or Firm*—Andrew C. Siminerio; Donald C. Lepiane

[57] ABSTRACT

Apparatus for handling a hot glass sheet during conveyance from a hot atmosphere to a cold atmosphere comprising a ring-like member having an upper surface engaging a glass sheet outline that consists essentially of a phenolic resin reinforced with fibers composed of an aromatic polyamid composition and a support ring attached to the ring-like member in facing relation to the ring-like member and sufficiently smaller in the dimensions than those of the ring-like member to permit the ring-like member to interpose between the support ring and a supported edge of a glass sheet so as to provide thermal insulation as well as shielding between the metal support rings and the edge of the glass sheet.

15 Claims, 2 Drawing Sheets

TEMPERING RING DESIGN

BACKGROUND OF THE INVENTION

1. Field of the Invention

This invention relates to a device for transferring hot glass sheets from a shaping station to a cooling station, and particularly relates to the type of transfer device that returns empty to the shaping station for transferring a succeeding hot glass sheet to the cooling station to perform a mass production method for shaping and heat strengthening or tempering glass sheets.

2. Technology Problems and Patents of Interest

The prior art has provided devices for transferring hot glass sheets which comprise an outline or ring-type mold of relatively rigid metal that includes an outline upper surface shaped to conform to the shape desired slightly inward of the outline of the glass sheet. The glass sheet is heated and either pressed to shape between complementary molds and transferred to the ring-type mold or sagged by heat and gravity to the shape provided by the upper shaping surface of the mold. When the glass sheet is shaped, it is transferred while supported on the ring-type mold to a quenching station where it is quenched suddenly and rapidly by applying cold air blasts against the supported lower surface and against the upper exposed surface of the glass sheet.

Heating the glass sheet to its softening temperature followed by sudden chilling develops a stress pattern characteristic of tempered glass that includes a surface zone highly stressed in compression surrounding an interior zone stressed in tension. This stress pattern reduces the tendency of the tempered glass sheet to break, particularly if the surface zone is highly stressed. Furthermore, if tempered glass is fractured, it forms a number of small, smoothly surfaced particles that are less dangerous than relatively large, jagged fragments that result from the breakage of untempered glass.

When a shaped glass sheet contacts a hot, heavy metal rail during this rapid cooling, glass breakage can result from surface vents due to high tension stress established locally at the glass-metal contact areas. The prior art has recognized that the difference in heat conductivity between the glass sheet supported on the mold and the relatively heavy mold ring during rapid cooling causes these high tension stresses in the hot shaped glass sheet in the areas contacting the glass supporting rail of heavy metal. Hence, in recent years, the art has developed a ring-like member having a glass sheet supporting surface for the ring-type mold. The ring-like member is composed on non-metallic material having a low coefficient of thermal conductivity. The most effective solution to date uses a ring-like member having a glass engaging surface consisting essentially of a phenolic resin, preferably polyphenyl formaldehyde, reinforced with fibers composed of an aromatic polyamide composition. This preferred reinforced material is popularly termed aramid and will be so identified hereafter in this specification.

The material used to engage the glass is reinforced either by thickening its lower portion, which makes a ring-like member used as a non-metallic tempering ring awkward to handle because of the thickness needed for rigidity, or the glass engaging material is hugged and surrounded by a relatively heavy metal rail slightly larger than the outline of the supported glass sheet to impart rigidity to a ring-like member composed of a preferred non-metallic glass engaging material. Tempering ring structures comprising a ring-like member of aramid reinforced with a hugging heavy metal support ring have produced results superior to the prior art by maintaining the glass sheet in contact with the fiber reinforced phenolic resin material in spaced relation over the heavy metal rail of the tempering ring. However, still better results are desired to be consistent with an objective of manufacturing larger glass sheets of more complicated shapes than in the prior art with even less marking or venting than previously experienced.

U.S. Pat. No. 3,973,943 to Seymour discloses an outline ring-like transfer device for supporting shaped glass sheets after they are shaped and during the time they are rapidly quenched. The device includes a rigid, outline metal rail having an outline slightly smaller than that of the shaped glass sheet and a bar or plurality of closely spaced bar members of non-metallic material having a lower heat transfer coefficient than that of the rigid metal rail mounted in hugging relation against the rigid metal rail in position to conform to the outline rail. An upper edge portion of the bar or bar members is disposed above the upper edge of the rigid metal rail in a position to provide a glass sheet supporting surface in spaced relation above the upper edge of the rigid metal rail. The bar or bar members of the Seymour patent are composed of a laminated structure, such as fiber glass cloth or asbestos woven paper layers or the like, bonded together with a silicone resin binder or a phenolic resin binder. The glass engaging materials of this patent have been replaced by superior materials disclosed in the following patent.

U.S. Pat. No. 4,525,196 to Fecik et al. discloses a structure in which an exterior metal rail slightly larger than the outline of the supported sheet is used to reinforce a bar or bar portions of phenolic resin reinforced with aramid fibers to provide a support plane inboard of the metal reinforcement rail and above the upper edge of the metal reinforcement rail. The superior physical characteristics of the phenol resin (preferably polyphenyl formaldehyde reinforced by aramid aromatic polyamide fibers) is discussed in this patent and its disclosure, including a detailed discussion of these characteristics, is incorporated within this specification by reference. It is noted in passing that the glass engaging member spaces the glass, particularly its edge portion, from the heavy metal reinforcement rail but does not shield the glass from direct exposure to radiation from a closely adjacent heavy metal reinforcing rail.

U.S. Pat. Nos. 4,556,407 and 4,556,408 to Fecik et al. disclose spaced blocks supported by spaced metal rails above the level of the metal rails to provide spaced support members of a non-metallic material that supports hot glass sheets for tempering. The glass engaging members are adjustable in position relative to the spaced rails in both patents and may be pivotal, as in U.S. Pat. No. 4,556,407. The glass engaging members of these patents do not shield the glass from direct exposure to radiation from closely adjacent metal rails.

U.S. Pat. Nos. 4,282,026 and 4,361,432 to McMaster et al. disclose the use of a helical spring wound over a solid heavy metal tempering ring closely adjacent to the glass to space the glass from direct contact with the heavy metal tempering ring and thus reduce the cooling rate differences between the glass and the metal. The helical spring in these patents do not shield the glass from direct exposure to radiation from a closely adjacent tempering ring.

In addition, U.S. Pat. Nos. 4,363,163 and 4,421,482 to McMaster disclose non-metallic materials such as aromatic polyamid fibers wound around metal rotating conveyor rolls. However, these latter patents are limited to the use of such materials as a covering for rotating conveyor rolls for conveying hot glass sheets during thermal treatment and do not suggest using these materials to shield glass sheets from direct exposure to radiation from closely adjacent heavy metal tempering rings.

BRIEF DESCRIPTION OF THIS INVENTION

The present invention provides a tempering ring construction that further minimizes the thermal effect on the supported glass sheet due to a support member, and more particularly, a rigid steel ring that is used to reinforce the structural rigidity of an aramid ring-like member. The aramid ring-like member is constructed and arranged above the rigid steel ring in a position to shield the supported glass sheet marginal outline from substantial direct exposure to heat radiation from a closely adjacent metal support ring when the metal support ring reinforces the aramid ring-like member. The aramid ring-like member also insulates the glass sheet from direct conduction of heat from the slower cooling metal support ring of metal so as to permit the glass to avoid the establishment of steep thermal gradients during quenching that cause high tension stresses in the glass likely to cause glass breakage. In addition, the aramid ring-like member that supports the glass sheet has a series of fingers having rounded edge surfaces to avoid any sharp corners along the edge of the fingers of the ring-like member to further reduce visibility of marks associated with high tension stress areas in the glass sheet.

A preferred glass contacting material available commercially that is useful for the glass-engaging ring-like member of this invention is sold as ARK-2 ® by the Spalding Fiber Company, Inc., of Buffalo, N.Y. to identify a phenolic resin, preferably polyphenyl formaldehyde, reinforced with aramid fiber. The term "aramid" is a generic name for a class of aromatic polyamide fibers, preferably synthetic aromatic polyamids that are high molecular weight polymers in which amide linkages (CONH) occur along the molecular chain. These are presently identified by the trademark KEVLAR ® registered by DuPont. This invention involves a novel arrangement of this preferred glass engaging material with a metal support ring to improve the results obtained in U.S. Pat. No. 4,525,196.

These and other benefits of this invention will be better understood in the light of a study of a description of preferred embodiment which follows.

DESCRIPTION OF PREFERRED EMBODIMENTS

Figure 1:
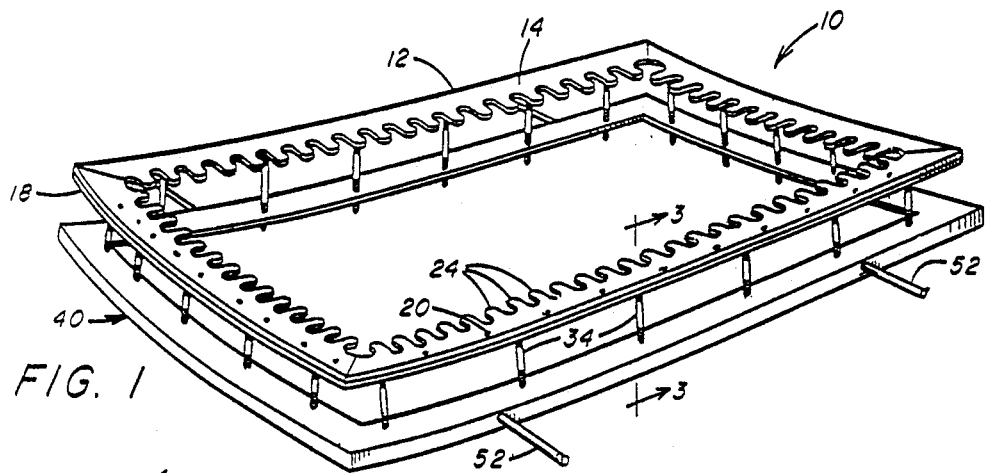
FIG. 1 is a perspective view of a tempering ring construction incorporating the novel features of the present invention.
Figure 2:
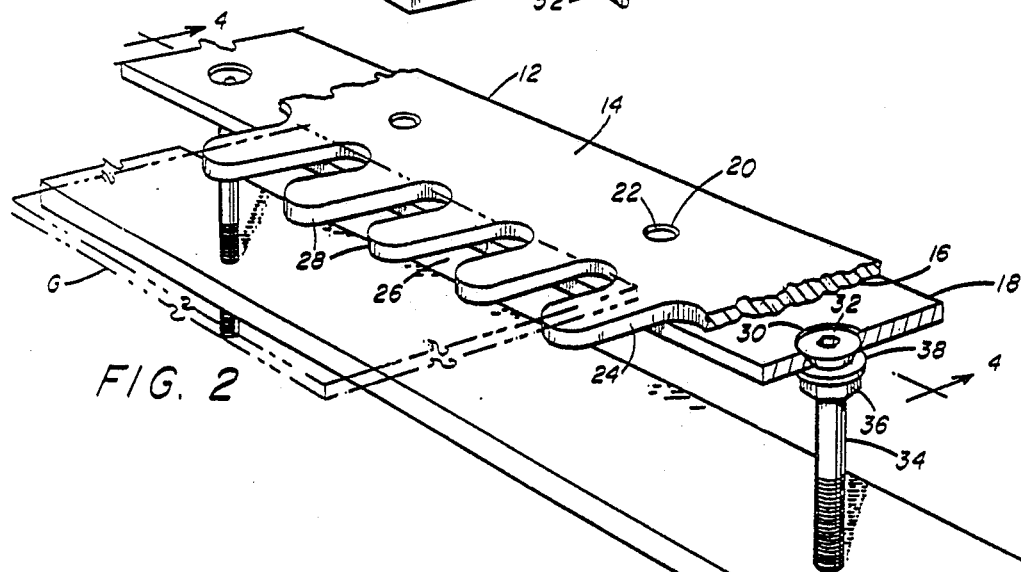
FIG. 2 is a fragmentary enlarged perspective view of a portion of the structure shown in FIG. 1, with portions removed for clarity.
Figure 3:
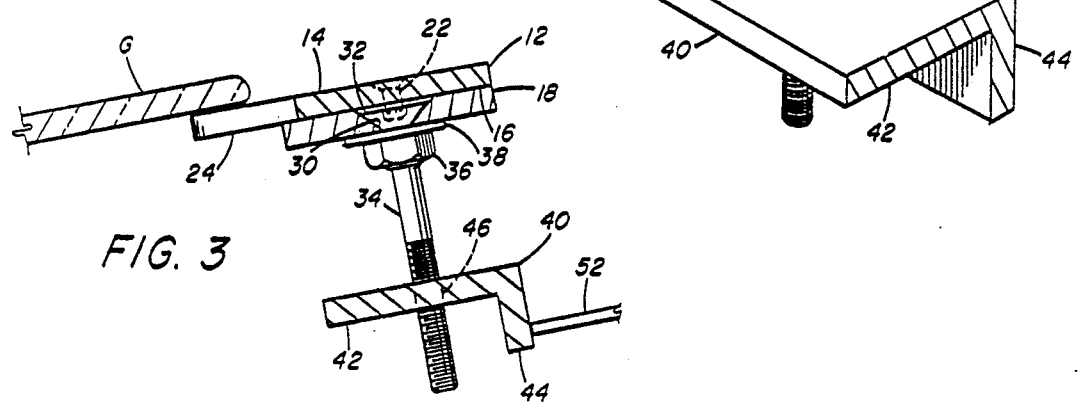
FIG. 3 is a sectional view taken along line 3—3 of FIG. 1.

FIGS. 1 and 2 show a perspective view of a tempering ring structure 10 that comprises a ring-like member 12 having a heat insulating upper surface 14 and a lower surface 16 (shown only in FIG. 2) that is supported by a metal support ring 18 having a general outline configuration corresponding to that of a glass sheet G to be supported. Although not limiting in this present invention, in the preferred embodiment, member 12 is made of aramid. The ring-like member 12 is connected to metal support ring 18 by providing a series of countersunk portions 20 in spaced relation along aramid ring-like member 12. Each countersunk portion 20 receives a flat headed screw 22 for attachment of the aramid ring-like member 12 to the metal support ring 18 therebelow at a series of spaced points, which are approximately 1 inch (2.54 cm) apart. In the particular embodiment depicted in FIGS. 2 and 3, ring-like member 12 is provided with a series of fingers 24 extending inwardly approximately 1 inch (2.54 cm) beyond the inner edge of the metal support ring 18, with spaces 26 between adjacent of said fingers 24. Fingers 24 are provided with rounded edge surfaces 28 to avoid sharp corner angles for the fingers 24 and the spaces 26 between adjacent fingers 24. The round edges 28 of the fingers result in fainter markings along the supported glass sheet edge than those visible in glass sheets supported on fingers with sharp corners.

Support ring 18 has a series of countersunk portions 30. Each of the countersunk portions 30 receives a flat upper head 32 of an externally threaded adjustment bolt 34 having a nut 36 and a washer 38 therearound near its upper end such that support ring 18 is captured between head 32 and washer 38. A steel reinforcement frame 40 of angle iron construction is spaced below metal support ring 18 sufficient distance (e.g., on the order of 1 inch or more) so as to have little effect on altering the rate of temperature change in a glass sheet G supported on said tempering ring structure 10 when the latter is chilled rapidly. Frame 40 comprises an essentially horizontal flange 42 and an essentially vertical flange 44. The adjustment bolts 34 are sufficiently long to extend through internally threaded apertures 46 (shown in FIG. 3 only) of the horizontal flange 42 so that screwing or unscrewing each adjustment bolt 34 adjusts the vertical position of the countersunk portion 30 of support ring 18 that corresponds to and lies in alignment over the corresponding aperture 46 of horizontal flange 42 that receives the adjustment bolt 34 therethrough. Each adjustment bolt 34 is an element of adjustment means provided along the longitudinal dimension of support ring 18. In one particular embodiment of the invention, when each adjustment bolt 34 in turn is adjusted to provide a proper distance between support ring 18 and horizontal flange 42, its nut 36 is tightened against its washer 38 and support ring 18 to maintain the position of the localized portion of support ring 18 in the vicinity of said countersunk portion 30 in its desired location. If desired, nut 36 may be welded to adjustment bolt 34 to hold it in place. In addition, a lock nut (not shown) may be threaded onto bolt 34 at flange 42 to fix the relative position of bolt 34.

Figure 4:
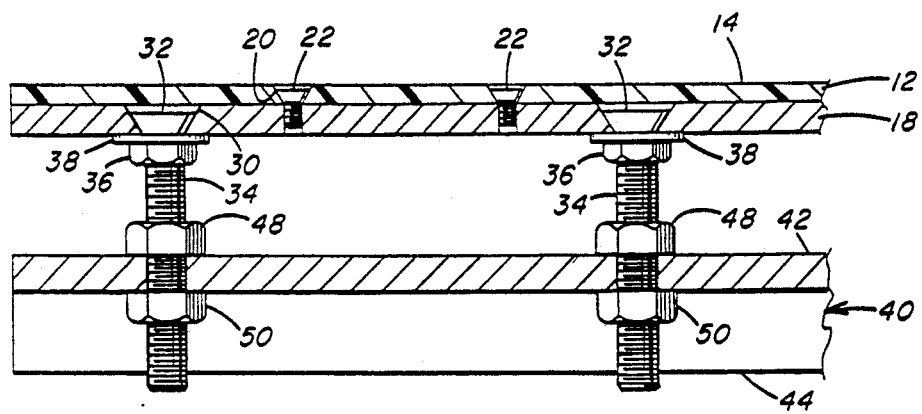
FIG. 4 is a sectional view taken along line 4—4 of FIG. 2.

As an alternate construction, apertures 46 in horizontal flange 42 need not be threaded. An upper lock nut 48 and a lower lock nut 50 are threaded around threaded adjustment bolt 34 on opposite sides of horizontal flange 42 and loosened or tightened to adjust the separation of support ring 18 over horizontal flange 42 as shown in FIG. 4. In addition, nut 36 and washer 38 can be eliminated in this embodiment of the invention by welding head portion 32 of bolt 34 directly to support ring 18.

Support ring 18 is relatively thin (e.g., 3/16 inch [0.48 cm]) and horizontal flange 42 relatively thick (at least ¼ inch [0.64 cm]). Hence, support ring 18 distorts and flange 42 remains relatively undistorted when either embodiment of adjustment bolt 34 is adjusted. The steel reinforcement frame 40 is provided with a vertical flange 44 to which are attached attachments 52 that attach the tempering ring structure and its reinforcing steel reinforcement frame 40 to a shuttle construction (not shown) of the type depicted in the U.S. Pat. Nos. 4,556,407 and 4,556,408 to Fecik et al., the description of which is incorporated herein by reference.

To adjust the tempering ring structure of this invention for a particular shape of glass sheet, the support ring 18 is shaped to an approximate elevation and outline configuration conforming to a shape slightly larger than that of the outline of the glass sheet to be conveyed. Each adjustment element, such as each adjustment bolt 34, is adjusted so that the length of the distance between the bottom surface of support ring 18 and the upper surface of the flange 42 of steel reinforcement frame 40 is adjusted locally at spaced distances along the length of the support ring 18. When this adjustment has been made for the entire support ring 18, the adjustment bolts 34 are locked in position, and ring-like member 12, having an aramid upper surface 14, is attached to support ring 18 through the series of longitudinally spaced flat-headed screws 22.

It is noted that the ring-like member 12 having a thickness of at least ⅛ inch (0.32 cm) is supported along its outer edge with its lower surface in direct contact with the upper surface of support ring 18 to completely cover support ring 18 with an insulating layer of aramid at least ⅛ inch (0.32 cm) thick provided by ring-like member 12. However, the lateral inboard edge of the ring-like member 12, which is wider than the support ring 18 in the first embodiment, has glass engaging fingers 24 that alternate with spaces 26 to support the edge of the glass sheet to be conveyed from a shaping station to a quenching station along spaced areas in laterally spaced relation inboard of the inner edge of support ring 18. Thus, ring-like member 12, being positioned above support ring 18, serves to shield the supported glass sheet edge from direct facing relation to support ring 18 and also provides thermal insulation interposed between the supported glass sheet edge and the reinforcing metal support ring 18.

In the apparatus of U.S. Pat. No. 4,525,196 to Fecik et al., a rigid metal ring member is disposed with its width extending essentially vertically to hug the outer periphery of a bar portion of aramid fiber reinforced phenolic material containing the ends of a plurality of fibers disposed above the upper edge surface of the reinforcing rigid metal rail so that when glass is deposited on the shaped glass sheet support member or tempering ring, it makes contact only with the glass engaging means of aramid fiber reinforced phenolic resin and is in spaced relation over the upper edge of the rigid metal rail or support ring that reinforces the aramid glass engaging member. However, it has been discovered that even better results are obtained from the present invention when the aramid ring-like member that engages the edge of the glass sheet is disposed with its width extending essentially horizontally and its inner end extending beyond the inner end of the reinforcing support ring of metal so that the aramid glass engaging ring-like member 12 intercepts radiation directed from the closely adjacent steel support ring 18 and prevents the latter from radiating heat directly onto the edge of the glass sheet. The term "essentially horizontal" includes planes that are tilted to a small angle from horizontal. Interposing the aramid ring-like member 12 between the glass sheet and the steel support ring 18 in this manner provides a thickness of heat-insulating material between the entire width (approximately 1 inch [2.54 cm]) of the metal support ring 18 and the glass sheet G in addition to avoiding direct exposure of the glass sheet to radiation emanating from the metal support ring 18. This construction differing from that of the Fecik et al. patents has improved the efficiency of operation of apparatus employing tempering rings comprising a ring-like member of aramid reinforced structurally by a metal support ring.

The embodiment just described has a ring-like member 12 whose outer lateral edge is aligned over the outer lateral edge of metal support ring 18 and whose inwardly extending fingers 24 extend inwardly beyond the inner lateral edge of metal support ring 18 in a cantilever arrangement. Since the aramid material which comprises fingers 24 is less rigid than steel, only a limited mass of glass can be supported over ring-like member 12. The need to fabricate larger glass sheets makes it necessary to increase the rigidity of the glass supporting fingers 24. One solution is to thicken the fingers. However this solution is not preferred because the aramid ring-like member 12 must be sufficiently thin to flex to conform with the shape of the metal support ring 18 when attached thereto and the fabrication of an aramid ring-like member 12 having a thin portion superimposed over metal support ring 18 and thick fingers 24 extending beyond the inner edge of metal support ring 18 presents problems of exactly matching the dimensions of the ring-like member 12 and metal support ring 18. In order to obtain the benefits of this invention in the production of larger, more complicated sheets, it is preferred to minimize the unsupported length of fingers 24 and at the same time to retain the maximum possible shielding effect of the aramid ring-like member 12 between any closely adjacent body of high heat capacity material such as metal support ring 18 and the supported glass sheet G.

Figure 6:
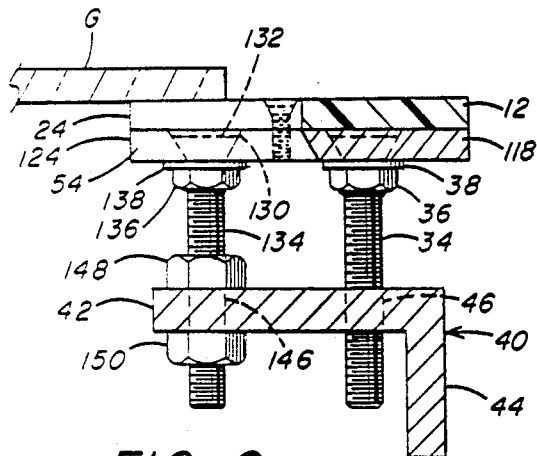
FIG. 6 is a sectional view taken along line 6—6 of FIG. 5.
Figure 7:
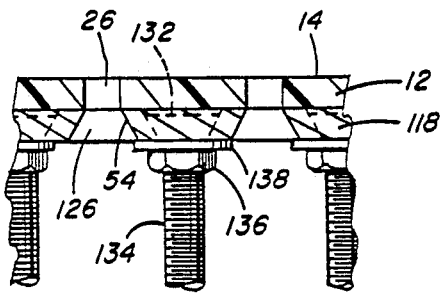
FIG. 7 is a sectional view taken along line 7—7 of FIG. 5.
Figure 5:
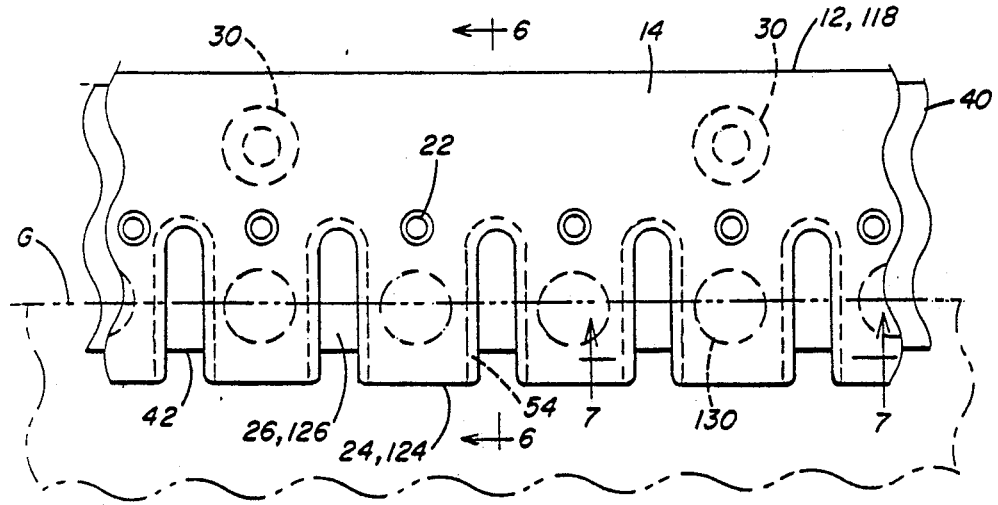
FIG. 5 is a plan view of a portion of the shaping surface of an alternate embodiment of the invention.

The second embodiment shown in FIGS. 5 to 7 meets the requirements discussed above for fabricating larger sized glass sheets. This embodiment includes a support ring 118 wider than support ring 18, and, although not limiting in the present invention, incorporates both ring adjustment arrangements shown in FIGS. 3 and 4. In particular, the laterally inner portion of support ring 118 includes fingers 124 and spaces 126 aligned under fingers 24 and spaces 26 of ring-like member 12. The horizontal flange 42 of the steel reinforcement frame 40 of this embodiment is provided with an inner line of smooth apertures 146 in addition to the outer line of threaded apertures 46. The inner apertures 146 receive longitudinally spaced, inner adjustment bolts 134 extending from countersinks 130 in fingers 124. Each finger 124 of support ring 118 is secured between the head 132 of bolt 134 and washer 138 by nut 136. As an alternative, head 132 may be welded directly to finger 124, in a manner as discussed earlier. The outer set of apertures 46 receive a set of longitudinally spaced threaded adjustment bolts 34 that extend from outer countersinks 30. Lock nuts 148 and 150 are provided around the inner adjustment bolts 134 on opposite sides of horizontal flange 42 to adjust the vertical spacing along inner adjustment bolts 134 between the inner end of the metal support ring 118 and the horizontal flange 42 independently of the adjusted distance between the outer portion of support ring 118 and the horizontal flange 42 along outer adjustment bolts 34, which are locked by welding or a locking nut (not shown). This provision of inner and outer adjustment bolts enables the support ring 118 to be tilted, preferably in but not limited to a laterally inward and downward direction relative to the longitudinal axis of the support ring 118. Aramid ring-like member 12 gets the same tilted orientation as support ring 118 when attached thereto using flat-headed screws 22 in countersunk portions 20.

The width of the support ring 118 in this embodiment extends substantially the entire width of the aramid ring-like member 12, except for its fingers 124 which are directly below the fingers 24 of the aramid ring-like member 12 and are preferably feathered in thickness so that the thickness of the fingers 124 of the support ring 118 is reduced toward its edge to form an oblique edge surface 54 facing away from the bottom surface of the ring-like member 12. As a result, the edge surface 54 of each finger 124 of the metal support ring 118 faces away from the glass sheet G supported on the upper surface 14 of the aramid ring-like member 12. In other words, in the embodiment of this invention depicted in FIGS. 5, 6 and 7, the aramid ring-like member 12 intercepts practically all of the radiation radiated from the metal support ring 18 and permits even less than the amount of radiation exposure of the glass sheet edge to the metal support ring that is provided in U.S. Pat. No. 4,525,196.

The foregoing description represents a description of preferred embodiments of the present invention. It is understood that various changes may be made without departing from the gist of the invention as defined in the claimed subject matter that follows. The present invention contemplates a glass sheet handling device comprising a relatively rigid member composed of a special material interposed between a metal reinforcing ring and the glass sheet wherein the special material insulates the glass sheet from direct contact to the reinforcing metal ring and also spaces and shields the glass sheet from direct exposure to radiation from the closely adjacent metal support ring, preferably during its rapid chilling while on a tempering ring.

What is claimed is:

1. Apparatus for handling a hot glass sheet during conveyance from a hot atmosphere to a colder atmosphere comprising:

a heat resistant ring-like member disposed with its width oriented essentially horizontally and having an upwardly facing surface constructed and arranged to engage a marginal outline portion of a heat softened glass sheet and a downwardly facing surface;

a support ring disposed with its width oriented essentially horizontally and attached to said ring-like member in facing relation to said downwardly facing surface to support said ring-like member thereover in such a manner that said ring-like member provides thermal insulation between said marginal outline portion of said sheet and said support ring and shields said supported glass sheet's marginal outline from substantial direct exposure to said support ring when said support ring supports and reinforces said ring-like member;

a rigid reinforcing frame; and adjustment means comprising adjustment elements interconnecting said support ring in spaced relation to said rigid frame to hold said ring in adjustable spaced relation to said rigid frame at longitudinally spaced intervals therealong to adjust the elevational shape of said support ring along its outline by maintaining a desired spaced relation between said support ring and said rigid frame along each said adjustment element.

2. Apparatus as in claim 1 wherein said glass sheet engaging surface includes a phenolic resin reinforced with fibers composed of an aromatic polyamide composition.

3. Apparatus as in claim 2 wherein each of said adjustment elements has a length sufficient to separate said rigid reinforcing frame from said upwardly facing surface of said ring-like member by a distance sufficient to prevent the appearance of readily observable marks in said marginal edge portion of a supported glass sheet.

4. Apparatus as in claim 3 wherein said sufficient length is on the order of at least one inch.

5. Apparatus as in claim 2 wherein said adjustment means comprises an outer line of longitudinally spaced adjustment elements and an inner line of longitudinally spaced adjustment elements constructed and arranged for individual adjustment to tilt said support ring relative to its longitudinal dimension, to support said ring-like member in a tilted orientation when said ring-like member is attached to said tilted support ring.

6. Apparatus as in claim 2 wherein said ring-like member has an inner edge that comprises a series of fingers spaced from one another longitudinally of said ring-like member to support said glass sheet outline inward of said support ring.

7. Apparatus as in claim 6 wherein said glass sheet engaging surface includes a phenolic resin reinforced with fibers composed of an aromatic polyamide composition.

8. Apparatus as in claim 6 wherein said fingers have smoothly curved edge surfaces free from sharp corners.

9. Apparatus as in claim 1 wherein said ring-like member has an inner edge including a first series of inwardly extending fingers spaced from one another longitudinally along said ring-like member and said support ring has a second series of longitudinally spaced fingers constructed and arranged to support said first series of fingers.

10. Apparatus as in claim 9 wherein said glass sheet engaging surface includes a phenolic resin reinforced with fibers composed of an aromatic polyamide composition.

11. Apparatus for handling a hot glass sheet during conveyance from a hot atmosphere to a colder atmosphere comprising:

a heat resistant ring-like member disposed with its width oriented essentially horizontally and having an upwardly facing surface constructed and arranged to engage a marginal outline portion of a heat softened glass sheet and a downwardly facing surface;

a support ring disposed with its width oriented essentially horizontally and attached to said ring-like member in facing relation to said downwardly facing surface to support said ring-like member thereover in such a manner that said ring-like member provides thermal insulation between said marginal outline portion of said sheet and said support ring and shields said supported glass sheet's marginal outline from substantial direct exposure to said support ring when said support ring supports and reinforces said ring-like member;

said ring-like member has an inner edge including a first series of inwardly extending fingers spaced from one another longitudinally along said ring-like member and said support ring has a second series of longitudinally spaced fingers constructed and arranged to support said first series of fingers;

a rigid reinforcing frame; and adjustment means comprising adjustment elements interconnecting said support ring in spaced relation to said rigid frame to hold said support ring in adjustable spaced relation to said rigid frame at longitudinally spaced intervals therealong to adjust the elevational shape of said support ring along its outline by maintaining a desired spaced relation between said support ring and said rigid frame along each said adjustment element.

12. Apparatus as in claim 11 wherein each of said adjustment elements has a length sufficient to separate said rigid reinforcing frame from said upwardly facing shaping surface of said ring-like member by a distance sufficient to prevent the appearance of readily observable marks in said marginal edge portion of a supported glass sheet.

13. Apparatus as in claim 12 wherein said sufficient length is at least on the order of one inch.

14. Apparatus as in claim 13 wherein said adjustment means comprises an outer line of longitudinally spaced adjustment elements and an inner line of longitudinally spaced adjustment elements constructed and arranged for individual adjustment to tilt said support ring relative to its longitudinal dimension to support said ring-like member in a tilted orientation when said ring-like member is attached to said tilted support ring.

15. Apparatus as in claim 14 wherein said glass sheet engaging surface includes a phenolic resin reinforced with fibers composed of an aromatic polyamide composition.

* * * * *